(12) United States Patent
Kuenster et al.

(10) Patent No.: US 6,359,609 B1
(45) Date of Patent: Mar. 19, 2002

(54) BODY-MOUNTABLE DISPLAY SYSTEM

(76) Inventors: Gordon B. Kuenster, 1603 Evergreen Point Rd., Medina, WA (US) 98039; Kenneth H. Dickenson, Jr., 6624 128th Ave., SE., Bellevue, WA (US) 98006

( * ) Notice: Subject to any disclaimer, the term of this patent is extended or adjusted under 35 U.S.C. 154(b) by 0 days.

(21) Appl. No.: 08/821,696

(22) Filed: Mar. 20, 1997

(51) Int. Cl.[7] .............................. G09G 5/00; A45F 5/00; A47B 91/00
(52) U.S. Cl. ........................ 345/156; 224/270; 248/346
(58) Field of Search ........................... 345/8, 167, 163, 345/164, 169, 173, 184, 156; 224/929, 930, 270, 202; 248/346, 919; 359/630; 235/462; 297/217.1; 353/98

(56) References Cited

U.S. PATENT DOCUMENTS

| | | |
|---|---|---|
| 4,869,575 A | 9/1989 | Kubik |
| 4,934,773 A | 6/1990 | Becker |
| 5,023,905 A | 6/1991 | Wells et al. |
| 5,208,417 A | 5/1993 | Langer et al. |
| 5,281,957 A | 1/1994 | Schoolman |
| 5,311,203 A | 5/1994 | Norton |
| 5,408,346 A | 4/1995 | Trissel et al. |
| 5,416,310 A * | 5/1995 | Little .................... 235/462 |
| 5,416,730 A | 5/1995 | Lookofsky |
| 5,419,613 A * | 5/1995 | Wedeking ................ 297/217.1 |
| 5,539,578 A | 7/1996 | Togino et al. |
| 5,570,944 A | 11/1996 | Seder et al. |
| 5,581,492 A | 12/1996 | Janik |
| 5,621,572 A * | 4/1997 | Fergason .................... 359/630 |
| 5,631,669 A * | 5/1997 | Stobbs et al. ............... 345/163 |
| 5,726,684 A * | 3/1998 | Blankenship et al. ....... 345/167 |

\* cited by examiner

*Primary Examiner*—Mark R. Powell
*Assistant Examiner*—Thu Nguyen
(74) *Attorney, Agent, or Firm*—Wood, Phillips, VanSanten, Clark & Mortimer (57) ABSTRACT

A body-mountable display system having a first structure for receiving an input signal and producing a video output in response thereto, a garment wearable by a user, and a second structure for operatively connecting the first structure to the garment to allow the first structure to be universally repositionable relative to the garment. The first structure includes a hand-holdable portable display including a housing having a viewing aperture for viewing the video output. The second structure includes a flexible element having spaced ends with one end mounted to the garment and the other end including a structure for detachably mounting the portable display to the flexible element. The portable display may include a portable virtual image display for focusing the video output at one of (a) infinity and (b) a desired finite distance viewable by an observer. The body-mountable display system may include, in combination, a computer producing the input signal.

8 Claims, 7 Drawing Sheets

BODY-MOUNTABLE DISPLAY SYSTEM

FIELD OF THE INVENTION

The present invention relates to a body-mountable display system and, more particularly, to a display system detachably and/or variably secured to a garment wearable by a user.

BACKGROUND OF THE INVENTION

Various body-worn or body-mountable computer and computer-type devices are currently in existence. These devices generally include head-mounted displays which allow the user to perform tasks with both hands while monitoring the display. Often times, the head-mounted displays are mounted to goggles, glasses and/or a helmet, which is worn on the head of a user. The head-mounted displays can be uncomfortable, and may produce undue strain on the neck muscles of a user. Further, the head-mounted displays limit a user's visibility when placed in an operative viewing position. This limited visibility in turn limits a user's ability to perform certain tasks in which visibility is required. Accordingly, such head-mounted displays would not be practical, for example, in military applications where a soldier would be required to perform a variety of tasks while easily and simultaneously viewing both the display and his/her surroundings.

Alternatively, hand-held displays are being used which can be holstered or hung on the body when not in use. A disadvantage to the hand-held display is that it requires the use of at least one hand, and often times both. This places the user, requiring the use of both hands while monitoring the display, at a disadvantage. Further, the holstered display, when not in use, may interfere with the user's ability to perform certain tasks.

SUMMARY OF THE INVENTION

The present invention is specifically directed to overcoming one or more of the above-enumerated problems in a novel and simple manner.

The present invention is directed toward a body-mountable display system including a first structure for receiving an input signal and producing a video output in response thereto, a garment wearable by a user, and a second structure for operatively connecting the first structure to the garment to allow the first structure to be universally repositionable relative to the garment.

The body-mountable display system may further include, in combination therewith, a computer that produces the input signal.

The first structure may include a hand-holdable portable display, and the second structure may include a structure for detachably mounting the portable display to the garment.

The second structure may include a flexible element having spaced ends with one end mounted to the garment and the other end including a structure for detachably mounting the portable display to the flexible element.

The portable display may include a housing having a viewing aperture for viewing the video output, and a manual control operably connected to the housing for selectively controlling the video output and operation of the computer.

The manual control may include a computer mouse including a track ball for universal positioning of a cursor on the video output, and a touch pad engageable by a user for activating the computer to perform certain functions relating to a location of the cursor on the video output.

The computer may have an audio interface, and the portable display may include an audio control operably connected to the housing for providing audio signals to the audio interface in response to receiving voice commands from a user for selectively controlling the video output and operation of the computer via the voice commands.

The audio display may include a microphone formed on the housing.

A switch may be provided selectively variable between (a) a first state wherein the computer mouse is enabled and (b) a second state wherein the audio control is enabled for selectively controlling the video output and operation of the computer.

The housing may include a front wall at which the viewing aperture is defined, a back wall and side walls. The flexible element may be detachably mounted to the housing at the back wall of the housing.

The portable display may include a raised tab formed on the back wall of the housing, and the structure for detachably mounting the portable display to the flexible element and may include a member attached to the other end of the flexible element having a cooperating slot for removably receiving the raised tab. The second structure may further include a dove-tail connection between the raised tab on the back wall of the housing and the cooperating slot on the member.

Cooperating detent structures may be provided on the raised tab and cooperating slot to allow the portable display to be releasably secured in a plurality of different positions relative to the member.

The video output may include a display image and the portable display may include a portable virtual image display for focusing the display image at one of (a) infinity and (b) a desired finite distance viewable by an observer.

The garment may substantially conform to and overlie a substantial area of a user's body.

The flexible element may include a gooseneck support to allow the portable display to be universally repositionable to an infinite number of different positions relative to the garment.

Other aspects, objects and advantages of the present invention can be obtained from a study of the application, the drawings, and the appended claims.

DETAILED DESCRIPTION OF THE PREFERRED EMBODIMENT

Figure 1:
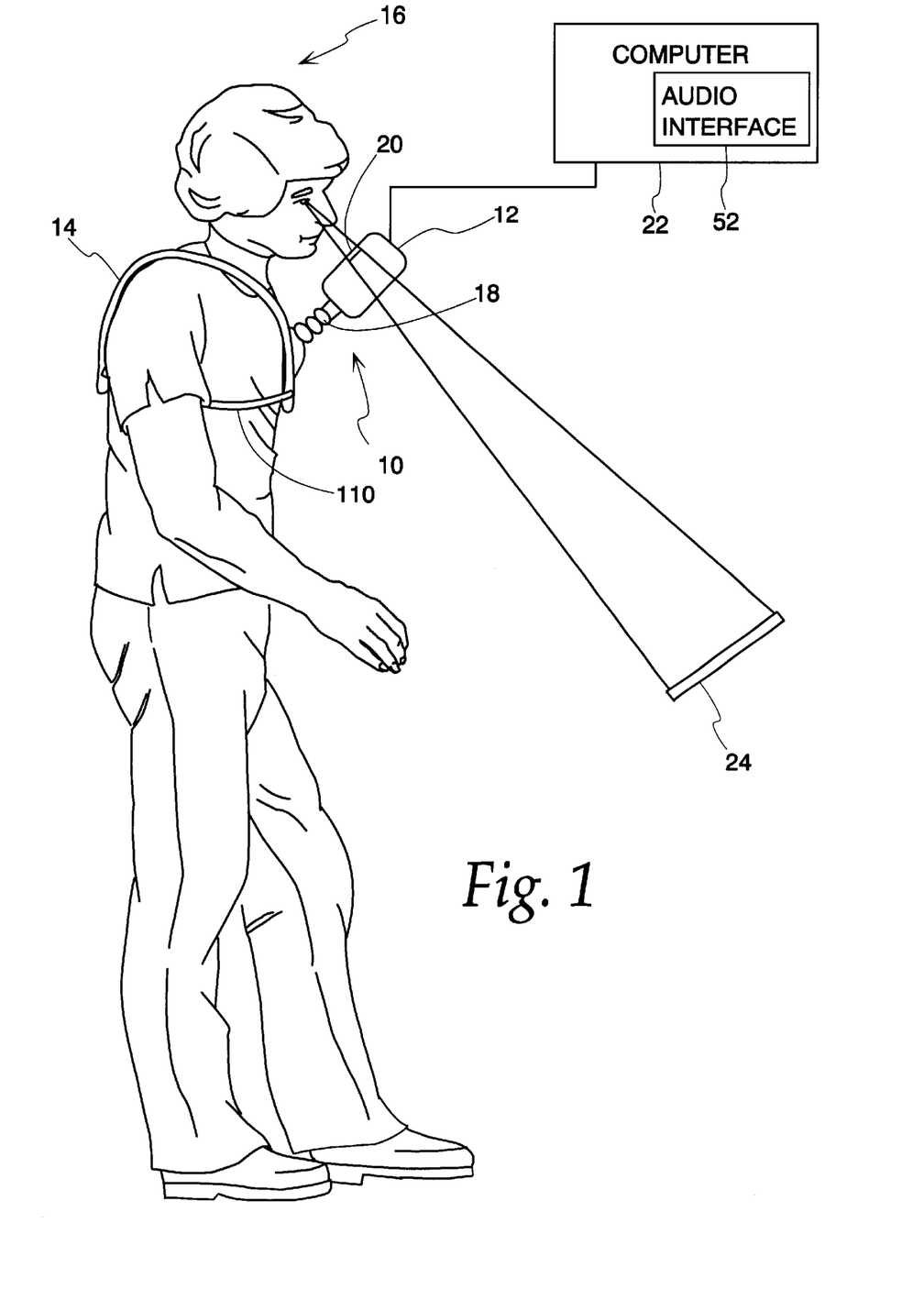
FIG. 1 is a perspective view of a body-mountable display system according to the present invention including a display, a garment wearable by a user, and a flexible element connected between the display and garment.

Referring to FIG. 1, a body-mountable display system is shown generally at 10. The display system 10 includes a display 12 attached to a garment 14 wearable by a user 16 via a flexible element 18. The flexible element 18 permits the user 16 to universally reposition the display 12 relative to the garment 14. This allows the user 16 to adjust the display 12 to a position for maximum readability through a viewing aperture 20 on the display 12, or to stow the display 12 out of the way when not in use. The user 16 is thus able to monitor the display 12 while simultaneously performing tasks with both hands. Generally, any occupation in which "hands-free" operation is desired can benefit from the body-mountable display system 10 of the present invention.

The display 12 operably interfaces with a computer 22. However, the display system 10 may be utilized with any device capable of outputting an audio and/or video signal. In a preferred embodiment, communication between the display 12 and computer 22 is accomplished via radio waves or other similar means. However, the invention also contemplates a cable connection (not shown) between the display 12 and the computer 22. The cable connection would most likely be utilized when the system components of the computer 22 are configured for carrying and/or securing on a garment, such as a vest and the like.

In one preferred form, the display 12 includes a virtual image display focusing an image 24 viewed through the viewing aperture 20 near infinity. With the display image 24 focused near infinity, the user 16 can focus on the image 24 with the display 12 at any distance from his/her eye without having to change eye focus. Changing the distance of the display 12 to the eye has a negligible effect on the overall focus. This permits the user 16 to bring the display 12 as close to the eye as is needed to reduce the effects of the sun or other bright lights on the display 12. Also, the virtual image display 12 will remain in focus regardless of the adjusted position of the display 12 or movement of the display 12 during walking or running.

Figures 2, 3, 4, 10:
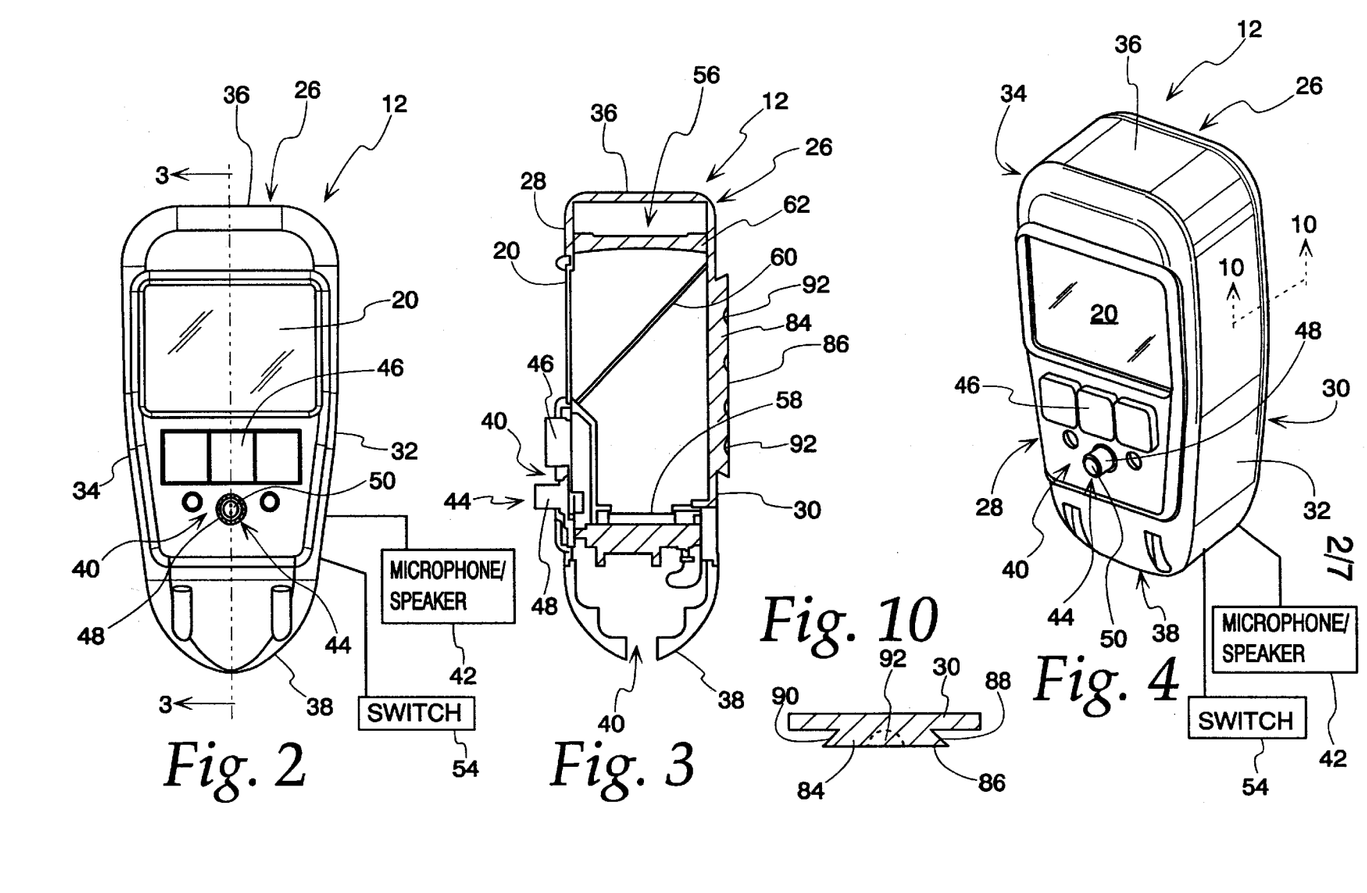
FIG. 2 is a front elevational view of the display.
FIG. 3 is a cross-sectional view of the display taken along line 3—3 of FIG. 2.
FIG. 4 is a perspective view of the display.
FIG. 10 is a cross-sectional view of the display taken along line 10—10 in FIG. 4.

FIGS. 2–4 depict one such virtual display 12. The display 12 consists of a housing 26 which includes a front wall 28, a back wall 30, side walls 32,34 and end walls 36,38. In the embodiment depicted in FIGS. 2–4, an opening 40 is provided in the end wall 38 for a cable connection of the display 12 to the computer 22. However, other connection configurations are also contemplated.

The front wall 28 of the housing 26 includes the viewing aperture 20 through which the image generated by the display 12 is viewable by an observer/user 16 as a display image 24 (see FIG. 1). The viewing aperture 20 preferably consists of a transparent material in a cut-out portion of the front wall 28 of the housing 26 to prevent dust and other foreign matter from entering the display 12. However, if so desired, the transparent material may be excluded. While the preferred embodiment contemplates focusing the image at infinity, imaging objects could be utilized which create the virtual image at any comfortable viewing distance and at any desired size.

The housing 26 is preferably made of a black ABS plastic and is designed to be light-tight and small. For example, in one embodiment of the invention, the housing 26 is approximately 96.25 mm by 59.5 mm with a depth of 41.5 mm. Utilizing these housing dimensions, the viewing aperture 20 would be a rectangular hole for viewing the image 24, approximately 32.99 mm by 47.39 mm.

The housing 26 is provided with computer control means permitting the user 16 to interface with a computer 22 to which the display 12 is operably connected. The control means generally includes a computer mouse 40 and a microphone/speaker 42, both operably connected to the housing 26. The computer mouse 40 is preferably formed on the front wall 28 of the housing 26, and includes a mouse control 44 and mouse buttons 46. The mouse control 44 includes a knob 48 projecting from the front wall 28 of the housing 26 with a track ball 50 universally rotatable within the knob 48. It should be understood that other configurations of the control means are also contemplated.

The microphone/speaker 42 is also preferably formed on the housing 26 and can be advantageously used by any user requiring simultaneous access to both audio and video information. Further, the microphone/speaker 42 permits the user 16 to interface with and control operation of the computer 22, which includes an audio interface 52 (see FIG. 1) permitting such use.

The display 26 also includes a switch 54 preferably disposed on the housing 26. The switch 54 is selectively variable between first and second states enabling either the computer mouse 40 or the microphone/speaker 42 to be utilized to control operation of the computer 22.

Referring more particularly to FIG. 3, the housing 26 generally at least partially encloses an image forming means shown generally at 56. The image forming means 56 receives a video signal with video information from the computer 22 and displays the video information as a display image 24 into the line of sight of an observer/user 16. The display image 24 is viewable by the observer/user 16 through the viewing aperture 20.

More specifically, the image forming means 56 generally includes an LCD or electroluminescent display 58, a beam splitter 60 and a spherical mirror 62. The image forming means 56 operates according to the same general principles as disclosed in prior application Ser. No. 08/697,035 filed by one of the named inventors herein, the disclosure of which is herein incorporated by reference. Accordingly, a detailed description of the operation of the image forming means 56 is not necessary.

It should be understood that the present invention is not limited to the above-mentioned image forming means 56 or its specific components. Many other electronic displays could be utilized as the image forming means 56. These include such displays as miniature CRT's, electroluminescent displays, field emission displays, raster displays and others that are currently being developed.

Figure 5:
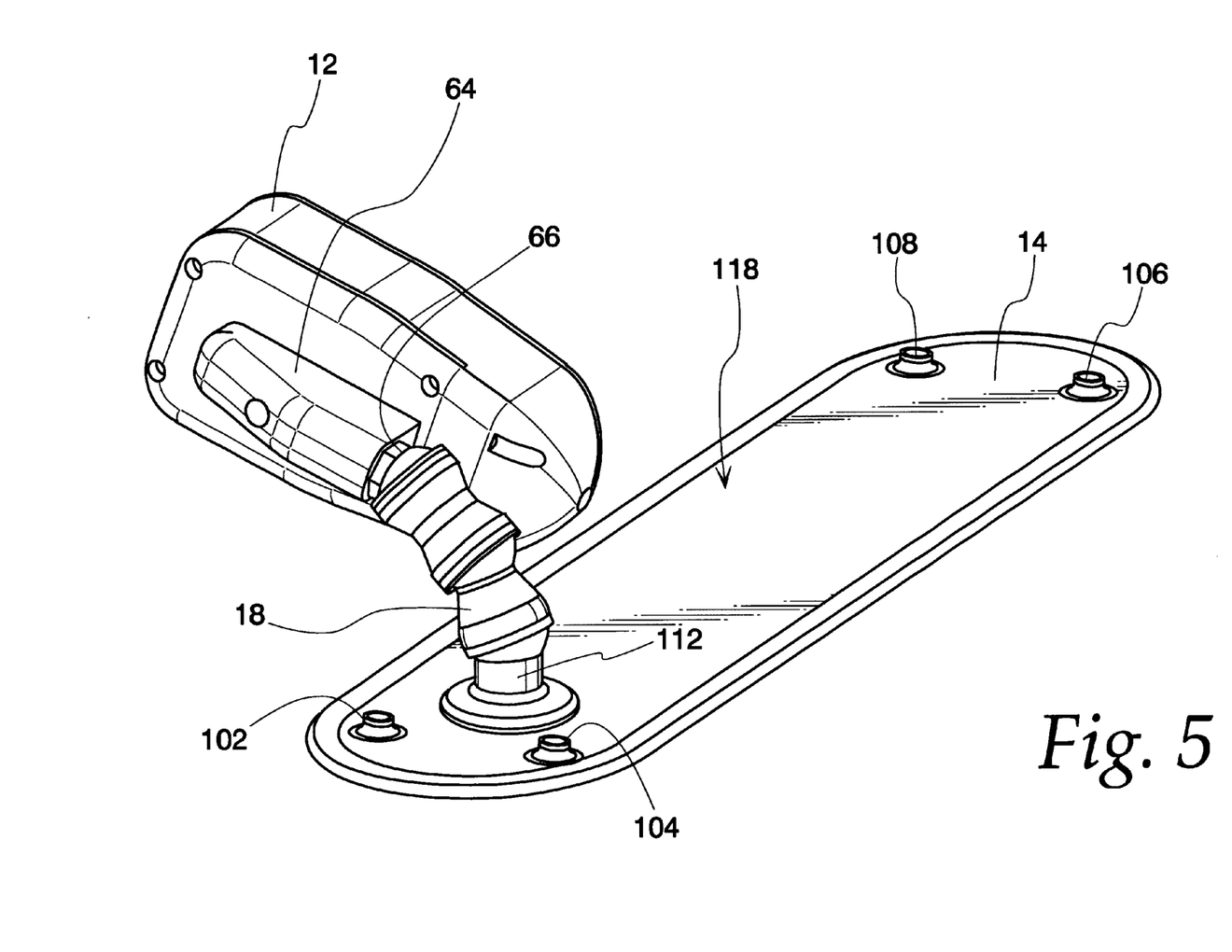
FIG. 5 is a perspective view of the display, flexible element and garment operably connected together and further including a member releasably securing the display to the flexible element.
Figure 6:
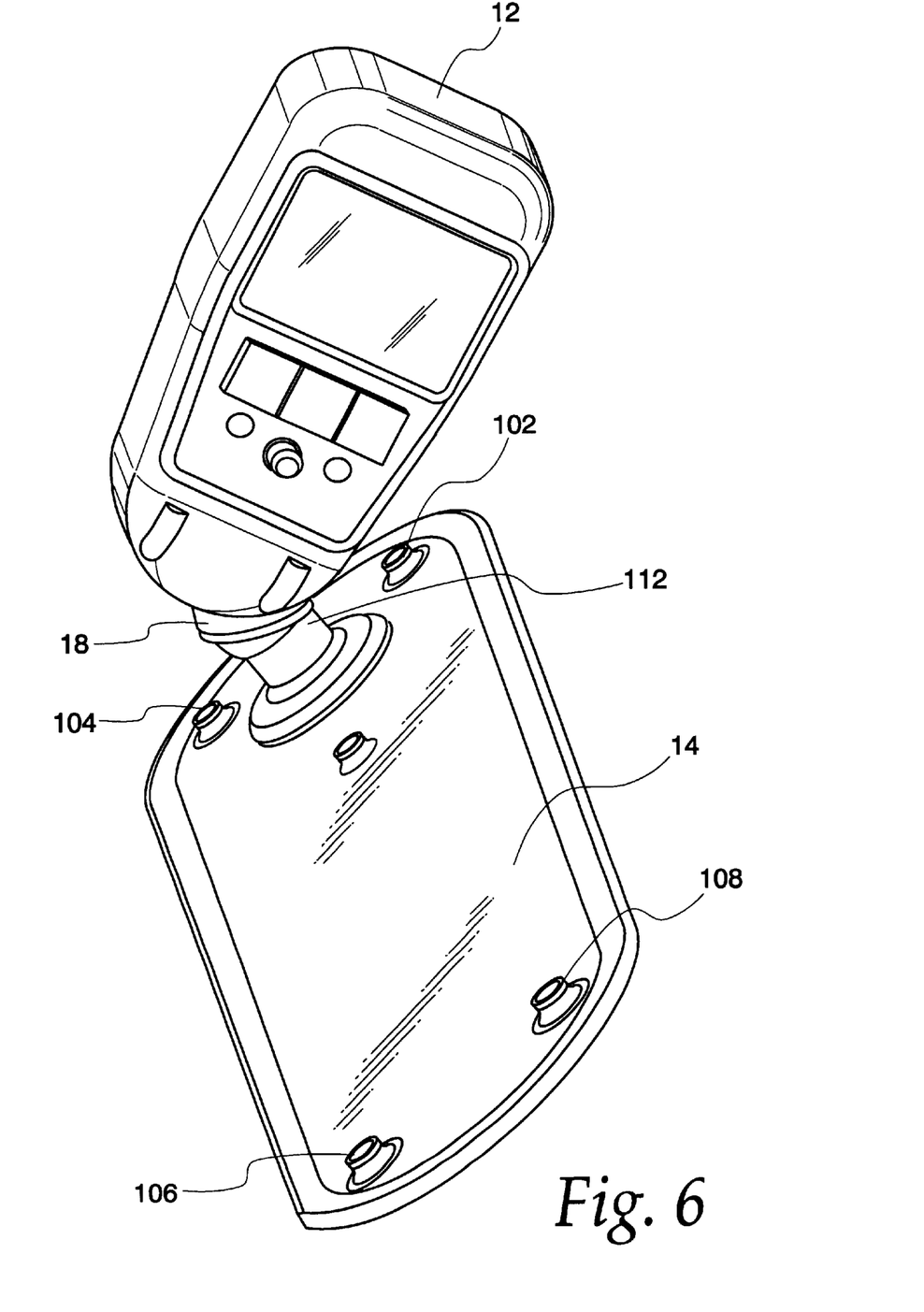
FIG. 6 is the perspective view of the display, flexible element and garment of FIG. 5 taken from a different viewing position.

Referring now to FIGS. 5–6, the display 12 is shown operably connected to the garment 14 via the flexible element 18. In a preferred embodiment, the flexible element 18 is made of black Delrin™ plastic and includes a gooseneck support. However, any type of flexible element permitting universal repositioning of the display 12 relative to the garment 14 may be utilized without departing from the spirit and scope of the present invention.

The display 12 is detachably secured to the flexible element 18 via a member 64 which is attached to an end 66 of the flexible element 18. In a preferred form, the member 64 is also made of black Delrin™ plastic and is snap fit into the end 66 of the flexible element 18. However, other connection methods may also be used.

Figure 7:
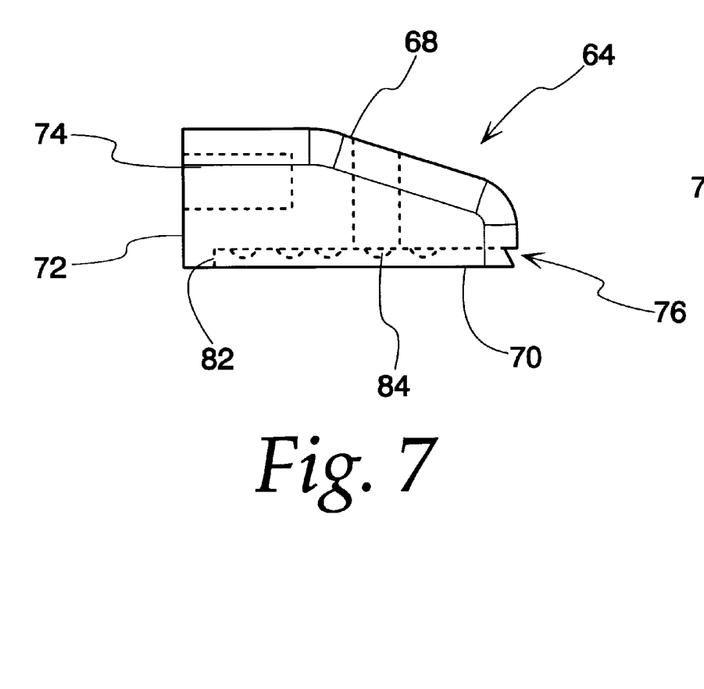
FIG. 7 is a plan view of the member releasably securing the display to the flexible element.
Figure 8:
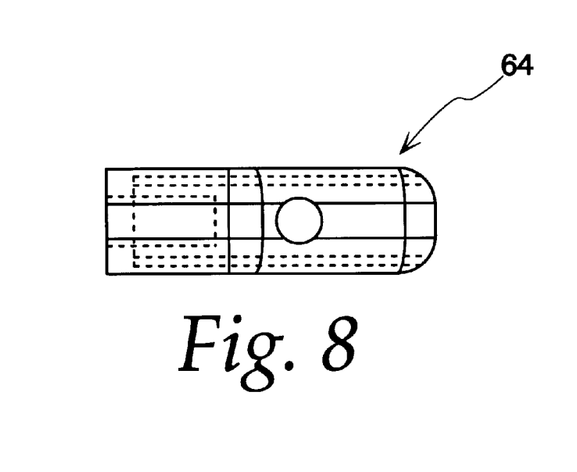
FIG. 8 is a top view of the member releasably securing the display to the flexible element.
Figure 9:
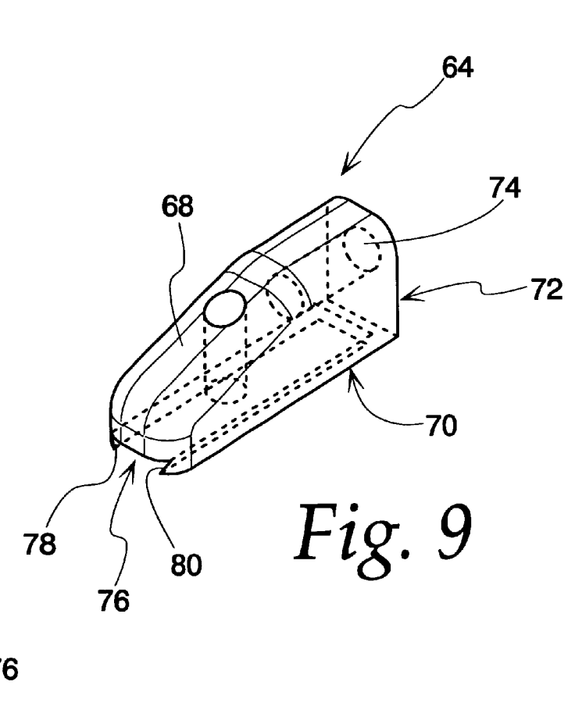
FIG. 9 is a perspective view of the member releasably securing the display to the flexible element.

The member 64 is shown more particularly in FIGS. 7–9 and includes an angled top surface 68 and a substantially flat bottom surface 70. An end wall 72 includes a bore 74 which receives the end 66 of the flexible element 18 when the member 64 is attached thereto. The bottom surface 70 includes a slot 76 defined therein. The slot 76 is defined by side walls 78,80, having a dove-tail configuration, and an end wall 82. The bottom surface 70 of the member 64 within the slot 76 includes a plurality of spaced bumps/protrusions 84, the significance of which will become apparent.

As shown more clearly in FIGS. 3 and 10, the housing 26 includes a raised tab 84 formed on the back wall 30. The raised tab 84 is defined by an outer wall 86 and side walls 88,90, with the side walls 88,90 having a dove-tail configuration. The outer wall 86 includes a plurality of indentations 92 at spaced intervals along the length thereof. Attaching the display 12 to the member 64 consists of guidingly receiving the raised tab 84 into the slot 76. The corresponding bumps 84 and indentations 92 engage as the raised tab 84 is slid into the slot 76. The protrusions 84 and indentations 92, in combination, provide a detent means securing the display 12 in a plurality of positions relative to the member 64. Side movement of the display 12 relative to the member 64 is prohibited by the dove-tail connection between side walls 78,80 of the member 64 and side walls 88,90 of the raised tab 84. The above attachment method permits a user 16 to readily remove the display 12 from and/or replace the display 12 on the member 64, depending upon the type of application required.

Figure 11:
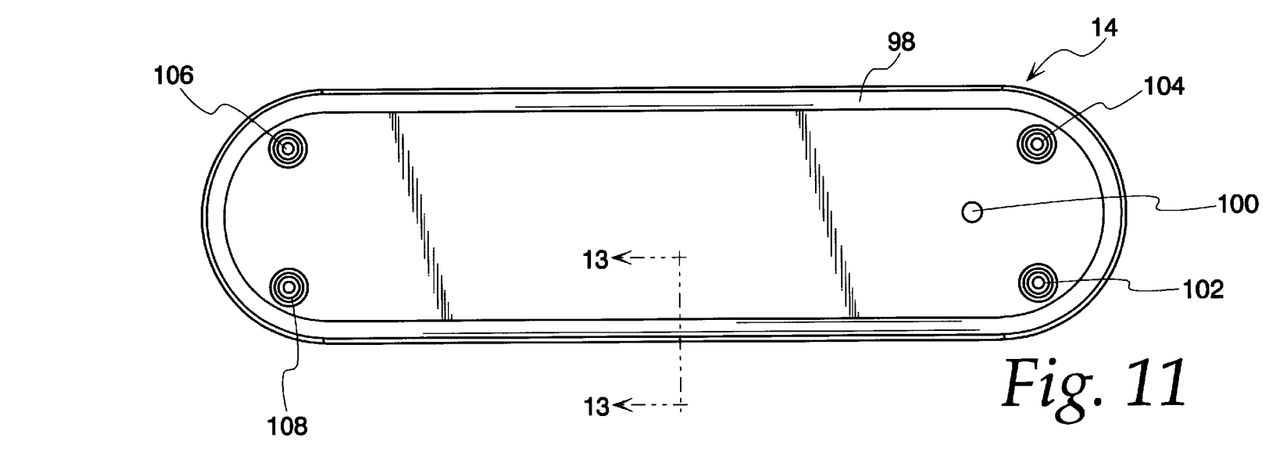
FIG. 11 is a top view of the garment.
Figures 12, 13:
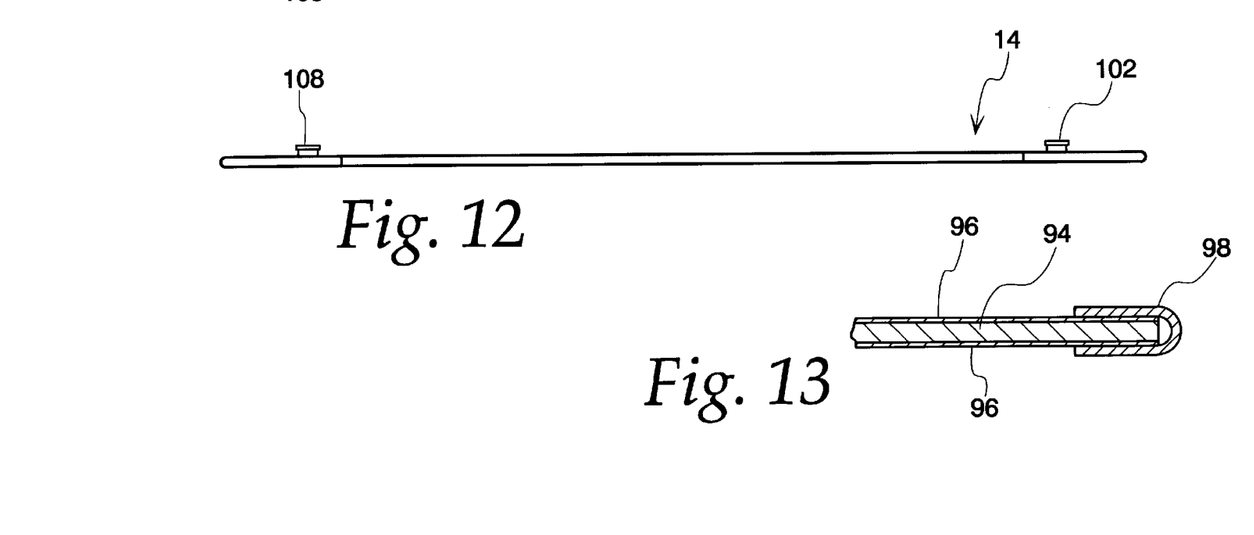
FIG. 12 is a side elevational view of the garment.
FIG. 13 is a cross-sectional view of the garment taken along line 13—13 in FIG. 11.

Referring now to FIGS. 11–13, the garment 14 of the body-mountable display system 10 will now be described. The garment 14 includes a sheet of high density polyethylene 94 disposed in between nylon sheets 96. The garment 14 is depicted as oval in shape, and its outer perimeter includes an acrylic awning canvas edging 98 holding the garment 14 together. The edging 98 may be attached by stitching or other conventional means.

The garment 14 is generally both rigid and flexible in that it will generally conform to and overlie a substantial area on a portion of the body of the user 16. However, once conformed to a position, the garment 14 is designed to generally remain in that position until it is reconformed to a different position. The garment depicted in FIGS. 11–13 generally fits conveniently over the shoulder of a user and conforms to the shape thereof.

The garment 14 includes an aperture 100 which is designed to attach to the flexible element 18 as will be described hereinafter.

In the particular embodiment depicted in FIGS. 11–13, eyelets 102,104,106,108 are secured to the garment 14 at optimum positions for securing the garment 14 to the body of the user 16 via straps 110, shown more particularly in FIG. 1. More specifically, if the garment 14 depicted in FIG. 11 were placed over the right shoulder of a user 16, the eyelets 102 and 108 would be connected via a strap 110 running under the right arm of the user 16, while the eyelets 104 and 106 would be connected via a strap 110 running across the chest, under the left arm and across the back of the user 16.

It should be understood that the garment 14 disclosed herein is merely one of a myriad of types of garments that are contemplated with the present invention. The garment may comprise a variety of shapes and sizes and may include, but by no means is meant to be limited to, such items as shoulder straps, vests, belts, shirts, arm straps, etc. Furthermore, the garment 14 may also be designed to be removably attached to the body of a user 16. In this instance, the garment may be inserted into a pocket or slot on a vest or jacket of the user, or may alternatively include means, such as Velcro™-type fasteners or dual locking snaps, for releasable attachment to a jacket or vest of a user 16.

Figure 14:
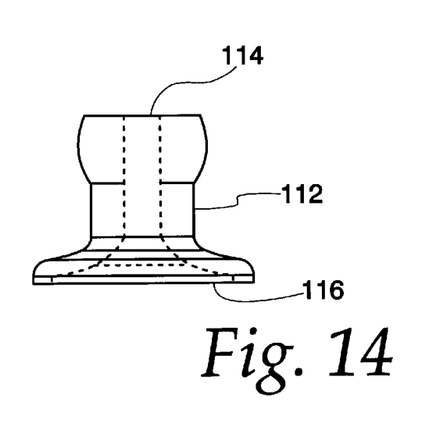
FIG. 14 is a side elevational view of a bottom segment of the flexible element.
Figure 15:
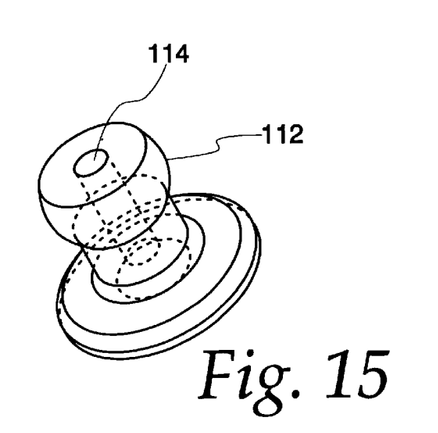
FIG. 15 is a perspective view of the bottom segment of the flexible element.
Figure 16:
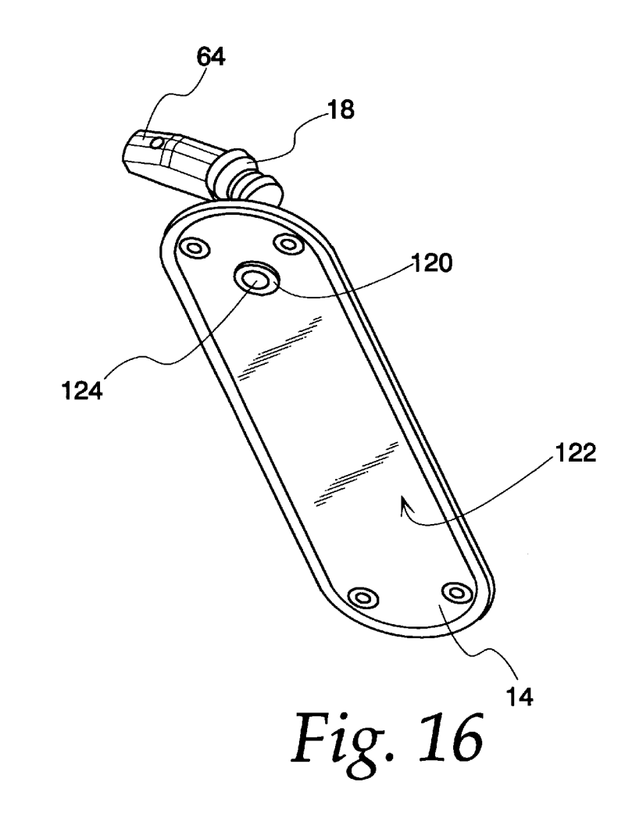
FIG. 16 is a perspective view of the display system of FIG. 5 taken from a viewing position at the underside of the garment, with the display omitted.

Attachment of the flexible element 18 to the garment 14 will now be described with reference to FIGS. 14–16. The flexible element 18 has a bottom segment 112 which includes a threaded bore 114 centrally disposed therethrough. Similar to the flexible element 18, the bottommost segment 112 is made of a black Delrin plastic. The segment 112 includes a bottom surface 116, which when operably mounted, engages a surface 118 of the garment 14 with the bore 114 substantially aligned with the aperture 100. A washer 120 is disposed on a surface 122 of the garment 14 opposite that of surface 118, with the washer 120 having a diameter larger than the diameter of the aperture 100. A screw 124 is passed through the washer 120 and is screwed into the bore 114 in the segment 112. The screw 124 is tightened to an appropriate tightening torque sufficient to maintain the bottom surface 116 of the segment 112 flush against the surface 118 of the garment 14. It should be noted, however, that other methods of mounting the flexible element 18 to the garment 14 are also contemplated by the present invention.

Furthermore, nonelectric versions are also contemplated. For example, a passive display consisting of a transparency in either an artificial light or sunlight can replace the LCD 58 and generate the required image. Applications could include high resolution maps, photographic slides, or microfiche reference sources.

Other aspects, objects and advantages of the present invention can be obtained from a study of the drawings, disclosure and appended claims.

We claim:

1. A body-mountable display system comprising:
 a hand-holdable portable display capable of receiving an input signal generated by a computer and producing a video output in response thereto, said video output including a cursor for selectively controlling operation of the computer;
 a garment wearable by a user; and
 a flexible element operatively connecting the portable display to the garment to allow the portable display to be universally repositionable relative to the garment, said flexible element having spaced ends with one end mounted to the garment and the other end including means for detachably mounting the portable display to the flexible element,
 wherein said portable display comprises:
  a housing having a front wall at which a viewing aperture for viewing the video output is defined, a back wall and side walls, wherein the flexible element is detachably mounted to the housing at the back wall of the housing; and a computer mouse operably connected to the housing for selectively controlling the video output and operation of the computer, wherein the portable display includes a raised tab formed on the back wall of the housing, wherein the means for detachably mounting the portable display to the flexible element comprises a member attached to the other end of the flexible element, said member having a cooperating slot for removably receiving the raised tab, and wherein the portable display is detachably mounted to the flexible element via a dove-tail connection between the raised tab on the back wall of the housing and the cooperating slot on the member.

2. In a display system for receiving a video signal produced by a computer and displaying video information generated by the video signal from the computer as a display image focused at one of (a) infinity and (b) a desired finite distance viewable by an observer, the improvement comprising:

a display for viewing the display image, said display comprising:

a housing having a front wall at which a viewing aperture is defined, a back wall and side walls;

an audio control operably connected to the housing for providing audio signals to an audio interface in the computer in response to voice commands from a user for selectively controlling the display image and operation of the computer via the voice commands;

a manual control operably connected to the housing for selectively controlling the display image and operation of the computer; and a switch selectively variable between (a) a first state wherein the manual control is enabled and (b) a second state wherein the audio control is enabled for selectively controlling the display image and operation of the computer;

a garment wearable by a user; and flexible element operatively mounting the portable display to the garment to allow the display to be selectively repositionable relative to the garment, said flexible element having spaced ends with one end attached to the garment and the other end including means for detachably mounting the display to the flexible element, said flexible element universally repositionable to place the display in an infinite number of different positions relative to the garment.

3. The improvement of claim 2, wherein the flexible element comprises a gooseneck support.

4. The improvement of claim 2, wherein the display comprises a hand-holdable portable display.

5. The improvement of claim 4, wherein the portable display includes a raised tab formed on the back wall of the housing, the means for detachably mounting the portable display to the flexible element comprises a member attached to the other end of the flexible element, said member having a cooperating slot for removably receiving the raised tab, and the mounting means comprises a dove-tail connection between the raised tab on the back wall of the housing and the cooperating slot on the member.

6. In a display system for displaying a magnified computer generated image as a display image focused at one of (a) infinity and (b) a desired finite distance viewable by an observer, the improvement comprising:

a hand-holdable portable display having a viewing aperture for viewing the display image;

a garment wearable by a user; and a flexible element operatively and detachably mounting the portable display to the garment to allow the portable display to be selectively repositionable relative to the garment, said flexible element having spaced ends with one end attached to the garment and the other end including means for detachably mounting the portable display to the flexible element, said flexible element selectively repositionable to place the portable display in an infinite number of different positions relative to the garment.

7. The improvement of claim 6, wherein the portable display comprises a housing having a front wall at which the viewing aperture is defined, a back wall and side walls, the back wall of the housing includes a raised tab formed thereon, the means for detachably mounting the portable display to the flexible element comprises a member attached to the other end of the flexible element, said member having a cooperating slot for removably receiving the raised tab, and the mounting means comprises a dove-tail connection between the raised tab on the back wall of the housing and the cooperating slot on the member.

8. The improvement of claim 7, further comprising cooperating detent means on the raised tab and cooperating slot to allow the portable display to be releasably secured in a plurality of different positions relative to the member.

* * * * *